(12) United States Patent
Klaehn et al.

(10) Patent No.: US 12,388,947 B2
(45) Date of Patent: Aug. 12, 2025

(54) METHOD OF TRANSMISSIVITY-AWARE CHROMA KEYING

(71) Applicant: Robert Bosch GmbH, Stuttgart (DE)

(72) Inventors: Johann Klaehn, Mannheim (DE); Stephan Lenor, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 137 days.

(21) Appl. No.: 18/155,160

(22) Filed: Jan. 17, 2023

(65) Prior Publication Data

US 2023/0231968 A1    Jul. 20, 2023

(30) Foreign Application Priority Data

Jan. 18, 2022   (DE) ..................... 10 2022 200 516.3
Dec. 7, 2022    (DE) ..................... 10 2022 213 200.9

(51) Int. Cl.
| | |
|---|---|
| H04N 5/265 | (2006.01) |
| G06N 3/08 | (2023.01) |
| G06V 10/42 | (2022.01) |
| G06V 10/60 | (2022.01) |
| G06V 10/82 | (2022.01) |
| G06V 20/40 | (2022.01) |
| H04N 5/272 | (2006.01) |
| H04N 5/275 | (2006.01) |
| H04N 9/75 | (2006.01) |

(52) U.S. Cl.
CPC ............ *H04N 5/265* (2013.01); *G06V 10/60* (2022.01); *G06V 20/46* (2022.01); *H04N 9/75* (2013.01); *G06N 3/08* (2013.01); *G06V 10/42* (2022.01); *G06V 10/82* (2022.01); *G06V 20/41* (2022.01); *H04N 5/272* (2013.01); *H04N 5/275* (2013.01)

(58) Field of Classification Search
CPC .......... H04N 5/265; H04N 9/75; H04N 5/272; H04N 5/275; G06V 10/60; G06V 20/46; G06V 20/41; G06V 10/42; G06V 10/82; G06N 3/08
See application file for complete search history.

(56) References Cited

U.S. PATENT DOCUMENTS

| | | | | |
|---|---|---|---|---|
| 7,609,327 | B2 * | 10/2009 | Matusik ................. | H04N 5/272 348/586 |
| 11,276,177 | B1 * | 3/2022 | Tsai ....................... | G06T 7/174 |
| 2014/0285634 | A1 * | 9/2014 | Rhoads ................... | G06T 5/00 348/47 |

(Continued)

OTHER PUBLICATIONS

Liu et al.—Some practical constraints and solutions for optical camera communication—Jan. 2, 2020—Royal Society Publishing (Year: 2020).*

(Continued)

*Primary Examiner* — Yujang Tswei
(74) *Attorney, Agent, or Firm* — NORTON ROSE FULBRIGHT US LLP

(57) ABSTRACT

A method of transmissivity-aware chroma keying. The method includes: a) obtaining a first shot of at least one object in front of a first background or a first scene; b) obtaining a second shot of the at least one object in front of a second background or a second scene, which differs at least partially from the first background or the first scene; c) extracting the at least one object, using the first shot and the second shot.

8 Claims, 6 Drawing Sheets

(56) References Cited

U.S. PATENT DOCUMENTS

2016/0148344 A1* 5/2016 Koga .................. G06T 5/20
                                                          348/336
2020/0166405 A1* 5/2020 Wissmann ........... G01N 21/359
2021/0383115 A1* 12/2021 Alon .................. G06Q 30/0276

OTHER PUBLICATIONS

Peers et al.—Wavelet Environment Matting—2003—The Eurographics Association (Year: 2003).*
Zou et al.—Generative Adversarial Training for Weakly Supervised Cloud Matting—2019—ICCV (Year: 2019).*
MacPherson et al.—WO2010096914A1—2010—Bank of Canada (Year: 2010).*
Zongker, et al.: "Environment Matting and Compositing," Proceedings of the 26th Annual Conference on Computer Graphics and Interactive Techniques, (1999), pp. 205-214; DOI: 10.1145/311535.311558.

* cited by examiner

FIG. 4
(related art)

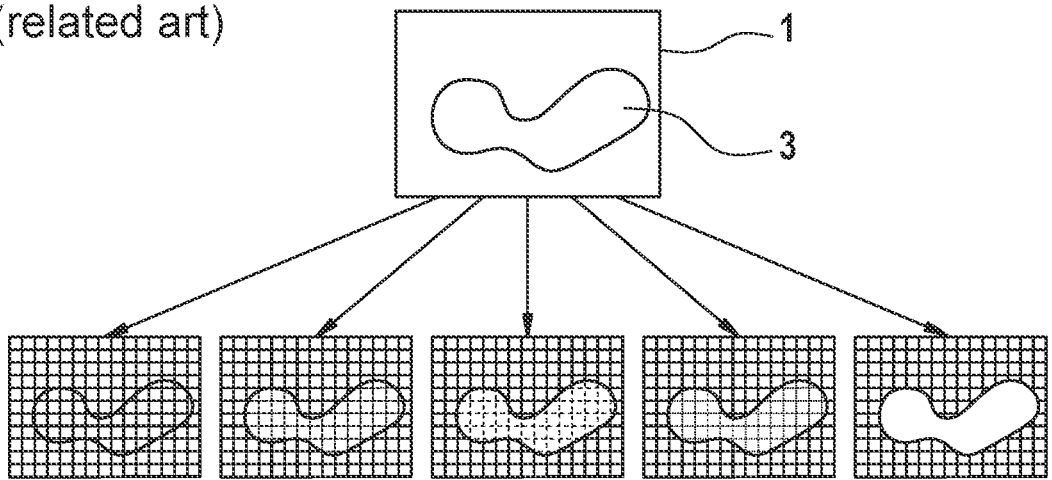

FIG. 5

|  | field observation | manually set/ staged scenarios | synthetic physics | GANs | Perlin noise | chroma keying |
|---|---|---|---|---|---|---|
| overall realism | +++ | +++ | --- | + | O | O |
| absorption effects | +++ | +++ | ++ | ++ | ++ | +++ |
| distortion effects | +++ | +++ | ++ | + | --- | --- |
| color effects | +++ | +++ | O | +++ | --- | +++ |
| temporal dynamics | +++ | +++ | --- | --- | --- | --- |
| in-effect variance | O | --- | --- | +++ | +++ | --- |
| effect variance | --- | + | --- | --- | --- | +++ |
| variance of the position | --- | --- | ++ | + | ++ | +++ |
| control over the position | --- | --- | +++ | --- | ++ | +++ |
| scene variance | --- | --- | +++ | +++ | +++ | +++ |
| labeling costs | --- | --- | +++ | +++ | +++ | +++ |
| quality of the labeling | + | + | +++ | O | +++ | +++ |
| rare scenarios | O | ++ | --- | + | O | ++ |
| camera independence | --- | --- | ++ | --- | ++ | ++ |

METHOD OF TRANSMISSIVITY-AWARE CHROMA KEYING

CROSS REFERENCE

The present application claims the benefit under 35 U.S.C. § 119 of German Patent Application Nos. DE 10 2022 200 516.3 filed on Jan. 18, 2022 and DE 10 2022 213 200.9 filed on Dec. 7, 2022, which are expressly incorporated herein by reference in their entireties.

FIELD

The present invention relates to a method of transmissivity-aware chroma keying, in particular, having an, and/or for, application in the area of mixed reality video blockage. Other terms, which denote the purpose and the procedure of the method described here are, e.g.: chroma keying including transmission factor determination; chroma keying including determination of the transmission factor; transmission factor-aware chroma keying; transmission factor-sensitive chroma keying; or possibly even multiscreen chroma keying. In addition, a computer program for executing the method, a machine-readable storage medium, in which the computer program is stored, as well as a system for executing the method, are specified.

BACKGROUND INFORMATION

Regarding chroma keying, which may also be translated into German as "color stamping": Chroma keying (often referred to as green screening or blue screening, as well) is a common method in the images or image sequences recorded in front of an ideally uniformly colored background wall (e.g., in front of a green screen), so that the foreground is able to be separated out and/or stamped out, and later, it may be put onto a different background.

Regarding possible applications: These days, cameras are highly prevalent, e.g., in monitoring, optical inspection, driver assistance systems, automated driving, and other robotics applications. In most cases, one must deal with possible impairment of the sensors due to internal or external factors. Such impairment is also referred to as "video blockage" or "video blockade." In the following, the English term video blockage is used. Video blockages may include, for example, all types of unwanted contamination and/or interference on the camera surface (e.g., rain drops, icing, fog, snow, dirt, dust, stickers, bird droppings, paper, and/or rock strikes). The effects of such contamination and/or interference referred to as video blockage are often increased by disruptive light sources (such as sun). In connection with motor vehicles, the phenomena of video blockage are, generally, highly varied, and in most cases, these phenomena occur only rarely. In addition, it is generally impossible to foresee all possible types of video blockage, which a camera may be exposed to in an open world scenario. Here and in the following, the term open world scenario denotes an open environment and/or (environmental) scenario, in contrast to a predefined environment.

Technically overcoming video blockage requires, generally, large quantities of data, e.g., for:
 the robustness of perception and of the overall system performance;
 the training of blockage detectors;
 the training of detectors for cleaning or heating requests; and/or
 the validation of blockage detectors, the perception, and the performance of the overall system.

Data about video blockages, that is, video blockage data, are acquired, generally, from actual or staged field recordings, or by generating data. In the case of data generation, there are the following common/conventional methods:
 synthetic emulation of physical effects, such as raindrops or fogged windshields and/or layers of condensation on a windshield;
 generative adversarial networks; and/or
 pattern generators, e.g., on the basis of Perlin noise.

Task(s) and/or Problem(s) to be Solved

Regarding chroma keying: Transmissivity-aware chroma keying may eliminate one or more of the following disadvantages of single-screen chroma keying:
 Ambiguity: In classical chroma keying, a foreground color (as a rule, RGB) and a foreground "opacity" (as a rule, a), are estimated for each pixel of an image. The opacity is similar to "opaqueness," it corresponds to the degree of concealment. If a foreground color is completely opaque and does not allow any more light through, then the opacity=1. In principle, opacity means the state "completely opaque" minus the transmission factor (1−transmission factor). In general, ambiguity is present if the foreground color is close to the background color, see, e.g., FIG. 4. Then, the opacity may not be determined correctly. Until now, this has been eliminated, as a rule, by error-prone heuristics or labor-intensive, manual postprocessing.
 Failure to consider the wavelength-dependency of the transmission factor: The combination of RGB and a scalar a value is generally insufficient for modeling the wavelength-dependent light transmission, that is, transmissivity, see, e.g., FIGS. 7A-7C and 8A-8C.

Regarding the application: Dealing with video blockage, in particular, during training, validation, and/or improvement of the robustness of a system, may require, generally, an enormous quantity of data, which exhaustively covers, in particular, the parameter space in view of aspects, such as position, structure, opacity, distortion, and color. In this regard, the current methods have some advantages and disadvantages, which are represented by way of example in the table shown in FIG. 5. In particular, all of the previous approaches have exhibited an insufficient effect variance, which may be a key for solving problems in connection with real, open world scenarios. Generally, data from the real world (real world data) are costly to acquire or to label, regardless of the approach used (e.g., fleet-based field monitoring or manual presentation=staging). In addition, it is, generally, not trivial to reuse these data in new generations of cameras.

SUMMARY

Specific example embodiments of the present invention is disclosed herein. Advantageous further specific embodiments and further developments are disclosed herein.

A method of transmissivity-aware chroma keying contributes towards achieving the above-mentioned object(s). According to an example embodiment of the present invention, the method includes at least the following steps:
 a) obtaining a first shot of at least one object in front of a first background or a first scene;

b) obtaining a second shot of the at least one object in front of a second background or a second scene, which differs at least partially from the first background or the first scene;

c) extracting the at least one object, using the first shot and the second shot.

According to an example embodiment of the present invention, in order to implement the method, steps a), b), and c), and optionally d), may be executed, for example, at least once and/or repeatedly in the indicated order. In addition, steps a), b), and c), in particular, steps a) and b), may be executed at least partially in parallel or simultaneously.

In the method described here according to an example embodiment of the present invention, the transmissivity-aware chroma keying may be carried out, in particular, on the basis of a plurality of digital image representations, which are obtained by a camera. In this context, the transmissivity-aware chroma keying may preferably be based on a plurality of digital image representations. The method may be executed, for example, to generate training data for a learning algorithm (machine learning algorithm). For example, the machine learning algorithm may be intended and configured for detecting (physical) blockades in the field of view of an optical sensor for, e.g., a vehicle (in particular, a motor vehicle). The machine learning algorithm may include, by way of example, at least one artificial neural network or a comparable algorithm for implementing artificial intelligence. The generating, that is, the execution of the method, may take place in an at least partially automated or manual manner. The method may advantageously be used to generate training data for an object recognition algorithm for a motor vehicle camera system.

According to an example embodiment of the present invention, in step a), a first shot of at least one object in front of a first background or a first scene is obtained. The shot may be dynamic, in the manner of a video recording. The shot may preferably be obtained in the form of an individual photograph or image. In other words, this may also be described, in particular, in such a manner, that a static shot is obtained as a first shot. The object may be a rigid, physical object. In this case, however, it is also possible for a layer of dust, water, drop, droplet, streak, spot, mud, etc., to be able to be recorded as an object. In particular, the object does not have to be a physically durable object. Consequently, the term, object, may be, but does not necessarily have to be, cohesive or rigid. Rather, the term, object, may include, in this case, any type of (recognizable and/or optically detectable) medium, including, e.g., smears, salt, or dust. Thus, the term may describe, in particular, both spatially cohesive and/or connected components, and disconnected pieces.

According to an example embodiment of the present invention, in step b), a second shot of the at least one object is obtained in front of a second background or a second scene, which differs at least partially from the first background or the first scene. In the method, it is advantageous that markedly more than just two shots may be taken into account. The object may preferably be shot in front of a plurality, e.g., five, ten, or more, backgrounds differing from each other (in particular, by color).

According to an example embodiment of the present invention, in step c), the at least one object is extracted, using the first shot and the second shot. For example, the object may be extracted in such a manner, that it may be kept ready in the manner of a template (stencil). If more shots of the object (in each instance, in front of backgrounds different from each other) are available, that is, are taken, then, of course, further, preferably all available, shots may be used in step c). For extraction, e.g., the color and the transmissivity of the object may be estimated for each pixel. Gradual pixel-by-pixel transition between the foreground object and the respective background on the basis of a foreground opacity may be carried out as an advantageous model. The extraction may be carried out in an advantageous manner as a function of transmissivity and/or as a function of the opacity.

In one particularly advantageous specific example embodiment of the present invention, during the staging, more than only one background color, that is, at least two different backgrounds having different background colors, are used. In this manner, the transmissivity of the foreground may advantageously be extracted without heuristics or manual postprocessing. In particular, (to extract the object) a transmissivity may be estimated, which is a function of wavelength and may advantageously allow completely new effects to be determined and/or applied with the aid of chroma keying.

The term transmissivity is used, in particular, to describe generally the ratio of transmitted radiation to incident radiation, in particular, in connection with background light, which travels through an object in the direction of an observer/a camera. The transmissivity may be used as a measure that is a function of wavelength or not a function of wavelength. It may be equated to the physical term transmission factor. Consequently, the term opacity (symbol: a), which is established in chroma keying, may be used in close connection with it. As a rule, opacity is a wavelength-independent measure of:

opacity=1−transmissivity.

According to an advantageous embodiment of the present invention, in a step d), the extracted object is combined with a third background or a third scene. In particular, the third background or the third scene differs at least partially from the first background and/or the second background or the first scene and/or the second scene. This step is preferably repeated, using a plurality of backgrounds/scenes. The object may be transmitted (possibly, in modified form) to, for example, more than ten, more than twenty, or, optionally, more than one hundred different backgrounds.

However, it is not always necessary for the third background to have to differ from the two other backgrounds. For example, in order to test the method, it may be useful to apply the extracted object to a background as similar as possible to the background used at the time of shooting, in order to compare, for example, to the actual shot (ground truth).

According to a further advantageous embodiment of the present invention, the method is used for generating mixed reality data for and/or of video blockages. In particular, the method may be used for generating mixed reality data, in order to simulate video blockages or instances of video impairment. In particular, data, which are made up of data actually recorded and data artificially generated, are referred to here as mixed reality data. Thus, the mixed reality data may include, for example, an extracted object (whose data may be regarded here as artificially generated) and at least one background actually shot and/or scenery actually shot.

As an alternative, or cumulatively to video blockage simulations, the method according to the present invention described herein may also be used in an advantageous manner to render the detection of environmental conditions by a camera, and the associated evaluation (perception), robust. This rendering-robust is not only advantageous in the case of and/or in opposition to video blockage, but may also help (alternatively or additionally) against other disturbances or may help as regularization during the generalization of a machine learning model (in a manner analogous to dropouts, noise injections, cut-outs, etc.).

According to a further advantageous embodiment of the present invention, the first background and the second background differ in their color. For example, two or more different background colors may be used. In particular, the object may be shot in front of a plurality of backgrounds of different color.

According to a further advantageous embodiment of the present invention, the first shot and the second shot relate to the same image frame. The image frame may be understood to mean, in particular, that the shots are indeed taken in front of different backgrounds but from the same perspective (relative to the object). In other words, the image frame may be understood as, in particular, the frame around the object, into which the different backgrounds may each fit. Preferably, the orientation between the camera shooting the image, and the object, as well as the setting of the camera, are known exactly.

According to a further advantageous embodiment of the present invention, the method of simulating shots by a camera is used; the shots showing at least one object, which blocks at least a portion of the view of the camera. Comparatively rarely occurring disturbances of an optical field of view of a sensor by adverse physical influences (objects) may be advantageously augmented and/or artificially integrated by the method in different scenarios, in order to preferably generate mainly training data for an algorithm and/or a camera system.

According to a further advantageous embodiment of the present invention, the method is used for modeling the transmissivity as a function of wavelength. For example, during the extraction, shots may be adequately used to be able to take, in particular, three or more transmissivity channels into account. To model a wavelength-dependent transmissivity, for example, a three-channel α-expansion may be used, which superposes, for example, the RGB channels individually on the basis of a channel-by-channel opacity $(\alpha_r, \alpha_g, \alpha_b)$. The ascertained opacity by channel $(\alpha_r, \alpha_g, \alpha_b)$ may then be used to superpose the individual channels of the background and, thus, produce synthetically generated shots.

According to a further aspect of the present invention, a computer program configured to execute a method described here is specified. In other words, this relates to, in particular, a computer program (product) including commands that, in response to the execution of the program by a computer, induce it to carry out a method according to the present invention described here.

According to a further aspect of the present invention, a machine-readable storage medium, in which the computer program is stored, is also specified. The machine-readable storage medium is normally a computer-readable data carrier.

According to a further aspect, a system is specified; the system being configured for the execution of a method described here. The system may include, for example, a computer and/or a control unit (controller), which may execute commands in order to implement the method. The system is used to generate training data, which may then be used as training data for object recognition systems employed in the field (e.g., in the vehicle). Thus, the system dealt with here is a system for generating training data. To this end, the computer, that is, the control unit, may execute the specified computer program, for example. For example, the computer, that is, the control unit, may access the specified storage medium, in order to be able to execute the computer program.

Accordingly, the details, features, and advantageous embodiments discussed in connection with the method may also appear in the computer program and/or the storage medium and/or the system put forward here, and vice versa. In this respect, reference is made to the explanations there, in their full scope, in order to further characterize the features.

In the following, the design approach put forward here, as well as its technical field, are explained in more detail in light of the figures. It is emphasized that the present invention is not intended to be limited by the exemplary embodiments shown. In particular, in so far as not explicitly represented otherwise, it is also possible to extract or isolate partial aspects of the facts explained in the figures and to combine them with other parts and/or with knowledge from other figures and/or from the present description.

BRIEF DESCRIPTION OF EXAMPLE EMBODIMENTS

FIG. 4 shows an example of a problem from the related art.

FIG. 5 shows a table including a qualitative comparison of the data sources for video blockages.

DETAILED DESCRIPTION OF EXAMPLE EMBODIMENTS

Figure 1:
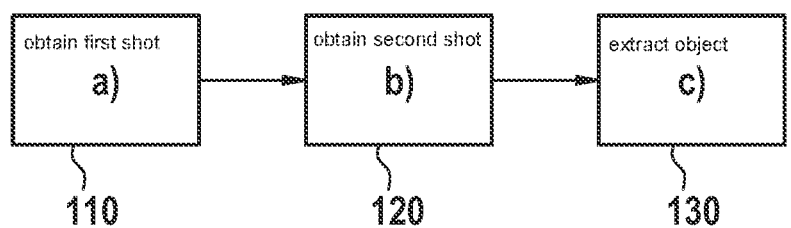
FIG. 1 shows an example of a sequence of the method of the present invention put forward here.

FIG. 1 schematically shows an example of a sequence of the method of the present invention put forward here. The method is used for transmissivity-aware chroma keying. The order of steps a), b), and c) represented by blocks 110, 120, and 130 is illustrative and may, for example, be run through at least once in the order shown, in order to carry out the method.

In block 110, according to step a), a first shot 1 of at least one object 3 in front of a first background 4 or a first scene is obtained. In block 120, according to step b), a second shot 2 of the at least one object 3 is obtained in front of a second background 5 or a second scene, which differs at least partially from first background 4 or the first scene. In block 130, according to step c), the at least one object 3 is extracted, using first shot 1 and second shot 2.

Figure 2:
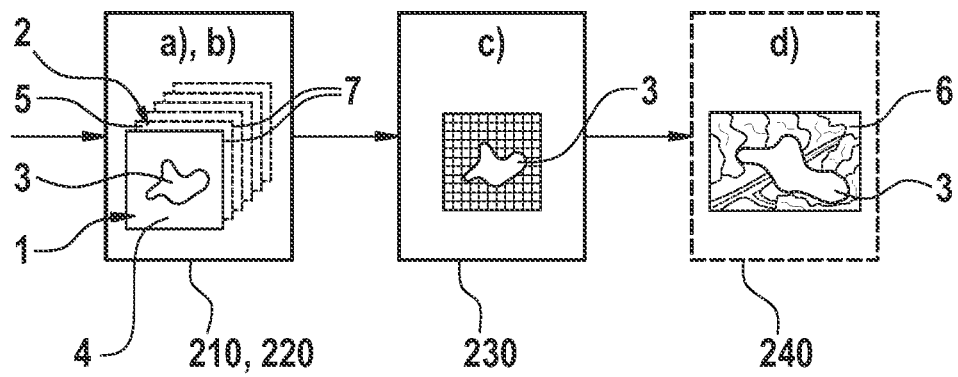
FIG. 2 shows an example of a sequence of an advantageous variant of an embodiment of the method of the present invention put forward here.

FIG. 2 schematically shows an example of a sequence of an advantageous variant of an embodiment of the method put forward here. The embodiment variant shows an advantageous possible use of the transmissivity-aware chroma keying. In blocks 210 and 220, according to an advantageous embodiment variant of steps a) and b), shots of a(n) (foreground) object 3 may be taken and/or obtained in front of a plurality of (many) backgrounds 4, 5, which may be, for example, of different colors. In block 230, according to an advantageous embodiment variant of step c), (foreground) object 3 is extracted and/or separated from backgrounds 4, 5 in color and transmissivity, using, for example physical modeling (minimal heuristics). By way of example, step c) may be carried out here once, but, in particular, on the basis of a plurality of backgrounds 4, 5. In this case, the transparent background is represented by a checkered pattern, which is possibly visible through object 3, as well (not graphically displayed here).

In block 240, an application may be carried out in accordance with an optional step d). In this connection, the extracted model and/or object 3 may be combined with one or more new backgrounds 6, such as background images or image sequences (scenes). Step d) may be carried out several times, that is, for a plurality of specific applications.

This represents an example that, and possibly of how, in a step d), extracted object 3 may be combined with a third background 6 or a third scene, which preferably differs at least partially from first background 4 and second background 5, or from the first scene and the second scene.

In this connection, FIG. 2 also illustrates an example that, and possibly of how, the method may be used to generate mixed reality data for and/or of video blockages. Thus, FIG. 2 schematically shows an example of a use of transmissivity-aware chroma keying for generating mixed-reality video blockage data, as well.

Figure 3:
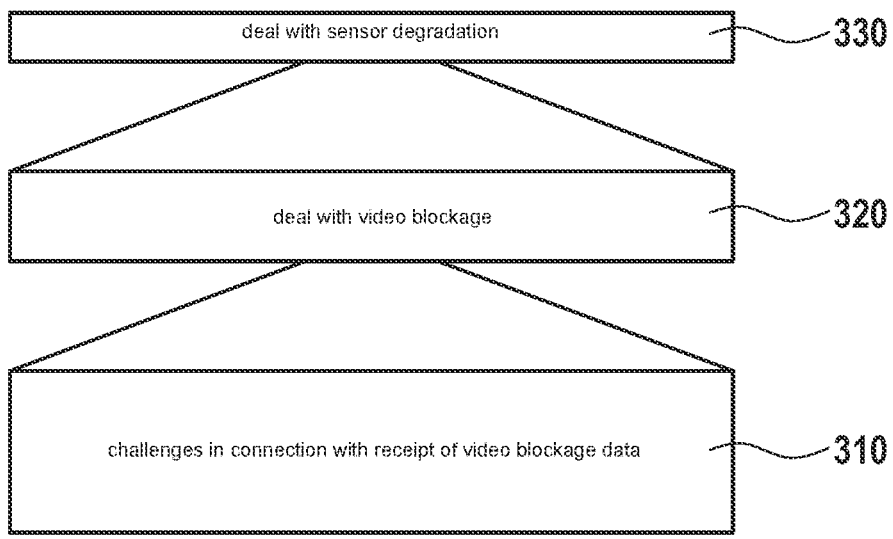
FIG. 3 shows an example of an overall view of possible applications of the method of the present invention.

FIG. 3 schematically shows an illustrative overview of possible applications and/or of a range of application of the generation of video blockage data. In this connection, FIG. 3 illustrates an example of an overview of the application context and, in particular, of challenges in the area of sensor degradation and video blockage. Using the generation of mixed-reality video blockage data, transmissivity-aware chroma keying may contribute to solving these challenges.

Challenges in connection with the receipt of video blockage data are represented by block 310. These may include, for example, a large number of variants (e.g., by wind, water, and light), the rareness of blockage objects (e.g., rock strike in the windshield), and/or open and/or unforeseeable (environmental) scenarios. Dealing with video blockage is represented by block 320. This may relate, for example, to rain drops, condensation, ice, dirt, bird droppings, etc. Dealing with sensor degradation, that is, with degradation of detection, such as in the context of autonomous driving (AD) systems, is represented by block 330.

FIG. 4 schematically shows an example of a problem from the related art. In this connection, FIG. 4 schematically shows an example of the dilemma of extracting a(n) (foreground) object 3 from a shot in front of a particular background 4. In this context, transmissivity and color may not generally be reconstructed completely, using only one background 4. On the contrary, there is ambiguity, that is, ambiguous interpretations, as are illustrated in FIG. 4 by way of example. Colors do not accompany the representation of FIG. 4. The transparency of object 3 decreases from left to right. The result (at the top) from the application of extracted object 3 to a given background 4 is, for example, identical for different extracted foregrounds (in this case, displayed in front of a grid for the purpose of illustration). For example, a dark green object 3 may be made clear in front of a bright green background 4, using: a gray, semitransparent object (on the left) 3, which is placed over background 4, or a dark green, opaque object (on the right) 3, which is placed over the same background 4. Due to the ambiguity shown, an infinite number of shades between them are also possible, as illustrated here.

In classical chroma keying (also referred to as green screening or blue screening), semitransparent foreground or chroma conflicts (e.g., the case in which the background color is also present in the foreground object) may only be resolved, using heuristics or extensive manual measures. This is because a shot 1, 2 in front of only one background color is generally not sufficient to separate the foreground color and transmissivity clearly from background 4, 5. For example, green parts of the foreground in front of a green screen may be interpreted as both transparent and as partially transparent as desired (see, e.g., FIG. 4).

FIG. 5 shows a table including a qualitative comparison of the data sources for video blockages.

Figure 6A:
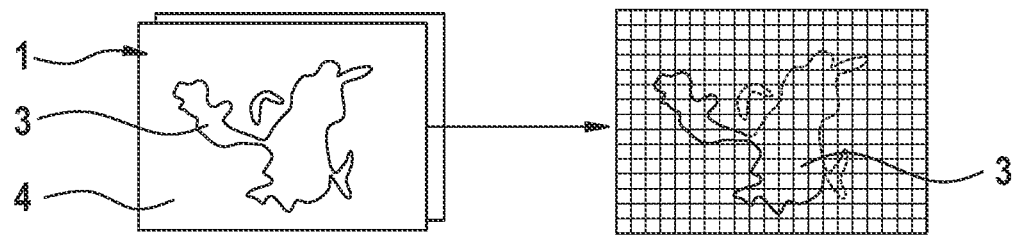
FIGS. 6A and 6B show an illustrative comparison of an application of the method of the present invention put forward here, with the related art.
Figure 6B:
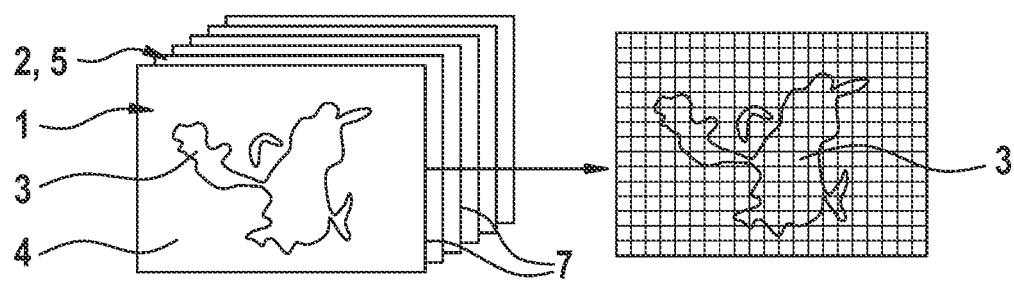

FIGS. 6A and 6B schematically show an illustrative comparison of a use of the method put forward here (FIG. 6B), with the related art (FIG. 6A). In this connection, FIGS. 6A and 6B schematically show an example of the extraction of a colored (for instance, green) piece of dirt as a(n) (foreground) object 3 to be extracted, in front of a similarly colored background 4 (that is, e.g., green as well). Due to the dilemma of a single background 4, the classical chroma keying has to revert to heuristics, which may fail, in principle (see FIG. 6A). For example, the color rendition may suffer, so that for instance, a brownish object 3 is extracted instead of a green object 3. Similarly, the opacity of extracted object 3 may differ from the transmissivity of actual object 3. The additional information regarding differently colored backgrounds 4, 5, as may be used in a specific embodiment of the method, may advantageously contribute towards adding the missing information and may thus contribute towards heuristics and/or subsequent, manual postprocessing being able to be advantageously eliminated (see FIG. 6B).

This also constitutes an example that, and possibly of how, first background 4 and second background 5 may differ in their color.

In addition, it is illustrated in FIGS. 2, 6A, and 6B by way of example, that, and possibly how, first photograph 1 and second photograph 2 may relate to the same image frame 7 (or even image detail). In this connection, image frame 7 may be understood to mean, in particular, that shots 1, 2 are indeed taken in front of different backgrounds 4, 5, but from the same perspective.

Figure 7A:
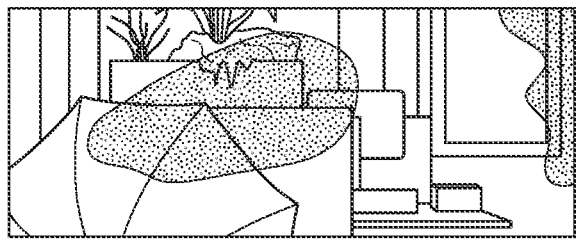
FIGS. 7A-7C show an example of a possible application of the method of the present invention described here.
Figure 7B:
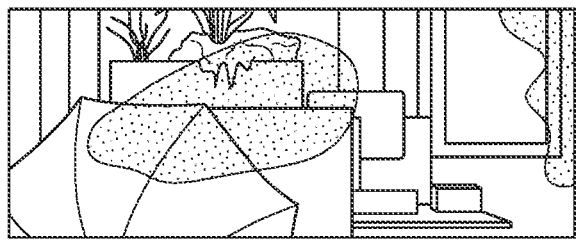
Figure 7C:
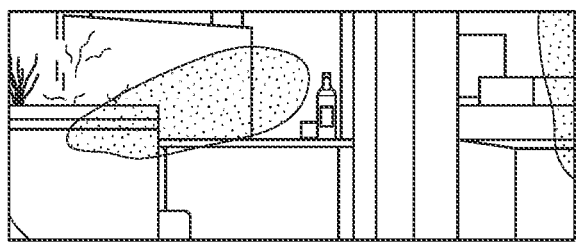

FIGS. 7A-7C show an example to clarify that generally, one transmissivity channel is not sufficient for modeling more complex transmissivity situations adequately, such as a view through brown glass. On the other hand, e.g., three transmissivity channels are more suitable, as may be used in an advantageous specific embodiment. Working with two or more different background colors, as is proposed in an advantageous specific embodiment, allows this information to be reconstructed in an advantageous manner. FIGS. 7A, 7B, and 7C each show graphical representations, which are reconstructed from colored representations; however, the information not being recognizable in the drawing, but being explained here:

The effect is based on different color channels and is therefore not reliably reproducible in the graphical representation selected here.

The image according to FIG. 7A comes, for example, from the application of an object 3 to an uncontaminated photograph of an office environment, using a model including only one transmissivity channel. The image according to FIG. 7B comes, for example, from the application of an object 3 to an uncontaminated photograph of an office environment, using a model including three transmissivity channels. Regarding possible exemplary embodiments for the transmissivity channels, reference is made to the explanations that follow below, in particular, to the example including the three-channel α-expansion. The image according to FIG. 7C shows a reference photo of a similar office environment, in which an actually dirty slide is situated in the optical path of camera 8. Thus, FIGS. 7A and 7B are generated synthetically, whereas FIG. 7C is an actual image. Thus, FIGS. 7A, 7B, and 7C are intended to show, by way of example, how, by the application of extracted objects 3, similar images are generated, as are also formed, when an object 3, that is, a dirty slide, is situated in the optical path of camera 8. Regarding the possible, optional use of reference photographs, reference is made to the following explanations below.

The illustrative comparison shows that in FIG. 7A, the applied object 3 appears homogeneous, while in FIG. 7B and FIG. 7C, for example, differences may be detected between the regions, in which the office environment appears through object 3, and the regions, in which outside light shines through the office window, through object 3.

In this connection, it may be determined that FIG. 7B reproduces the situation of reference photograph FIG. 7C more effectively. In particular, the color rendition in FIG. 7B is closer to the actual situation in FIG. 7C, seeing that here, in contrast to FIG. 7A, differences may be made out between the translucent, dark office environment and the translucent, bright, outside light. In addition, the contrast of the background structures is greater in FIG. 7B than in FIG. 7A.

Figure 8A:
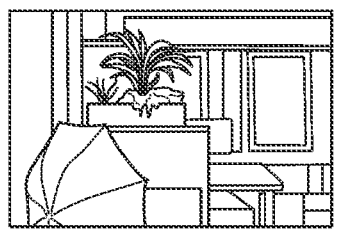
FIGS. 8A-8C show a further example of a possible application of the method of the present invention described here.
Figure 8B:
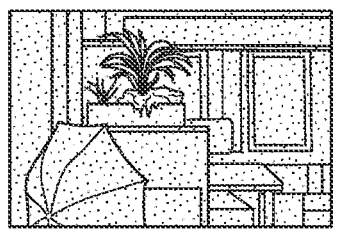
Figure 8C:
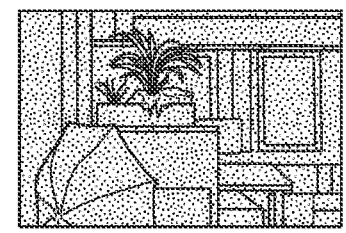

FIGS. 8A-8C shows an example of a synthetic demonstration of the limits of the wavelength-independent modeling. In FIG. 8A, a photograph of an empty office is displayed in a schematically "normal" manner. As shown in FIG. 8B, a three-channel transmissivity effect is applied to the empty office in accordance with FIG. 8B. The effects, which the use of a one-channel model instead of a three-channel model has, are shown in FIG. 8C. More intense dotting indicates that contrast is lost, and therefore, when the one-channel model according to FIG. 8C is used, the empty office is less recognizable than when the three-channel model according to FIG. 8B is used. Thus, it is apparent that generally, the wavelength-independent transmissivity (using one channel in accordance with FIG. 8C) is not capable of modeling a high background contrast in combination with intensive foreground coloration. While structures in the background are readily visible in FIG. 8B, these are no longer clearly recognizable in FIG. 8C, due to the loss of contrast. Consequently, the wavelength-dependent transmissivity (using a plurality of channels, in particular, using three channels according to FIG. 8C) may advantageously smooth the way for completely new chroma keying effects.

Therefore, FIGS. 6A through 8C show examples that, and possibly of how, the method for wavelength-dependent modeling of the transmissivity may be used.

Figure 9:
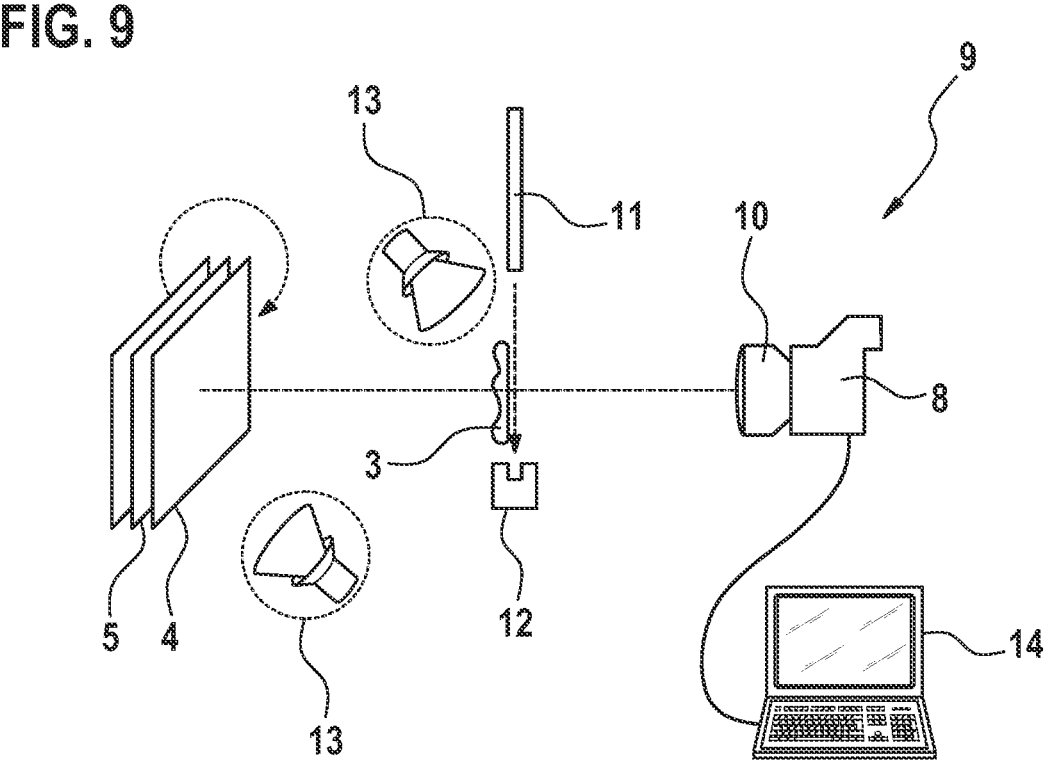
FIG. 9 shows an example of a shooting set-up for carrying out the method of the present invention.

FIG. 9 schematically shows an example of a shooting set-up for carrying out the method. A camera 8 having a suitable objective 10 shoots an object 3 and/or a staging medium 3 in front of advantageously differently colored backgrounds 4, 5 or screens (for example, projection screens or video screens). The staging medium and/or object 3 may be optionally applied to a removable/exchangeable staging plate 11, which slides in a holding device 12. As an option, lamps and/or illuminating devices 13 are used for illuminating background 4, 5 and/or the foreground and/or object 3. A (mobile) computer 14 may be used for supporting the shooting, e.g., for controlling camera 8, for storing the images, for support and guidance through the operation, and/or for monitoring the results.

This may constitute an example of an object recognition system 9 described here, for extracting and/or releasing the foreground (chroma keying system). In an advantageous embodiment of object recognition system 9, individual or a plurality of the above-mentioned elements may also be produced in an at least partially automated manner. Thus, by way of example, backgrounds 4, 5 may be changed in an automated manner, which may be controlled, for example, by computer 14.

Figure 10:
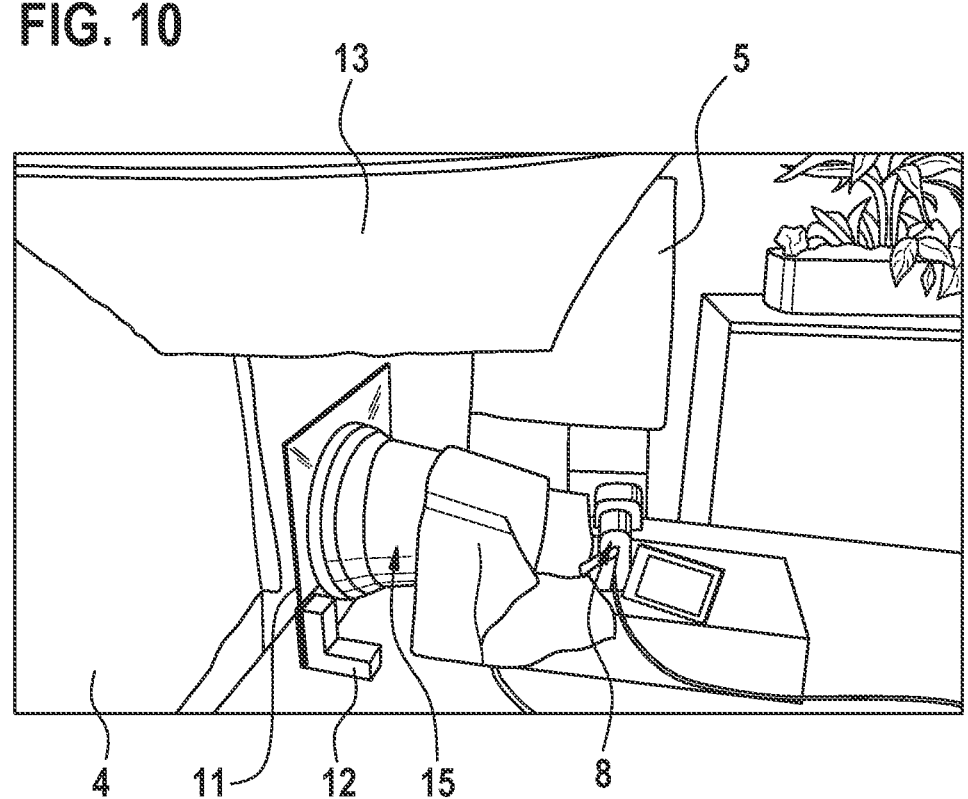
FIG. 10 shows a further example of a shooting set-up for carrying out the method of the present invention.

FIG. 10 shows an example of a shot, using a "table set-up." Camera 8 is, for example, a Canon EOS RP, which is connected to a notebook via USB-C and gphoto2. The staging takes place on exchangeable glass plates 11, which are kept in position by a holding device 12. The illumination takes place by both natural daylight and special photography studio illumination 13. A baffle 15 is used for preventing reflections on glass plate 11. Backgrounds 4, 5 are presentation boards, which are covered by material of different colors.

Figure 11:
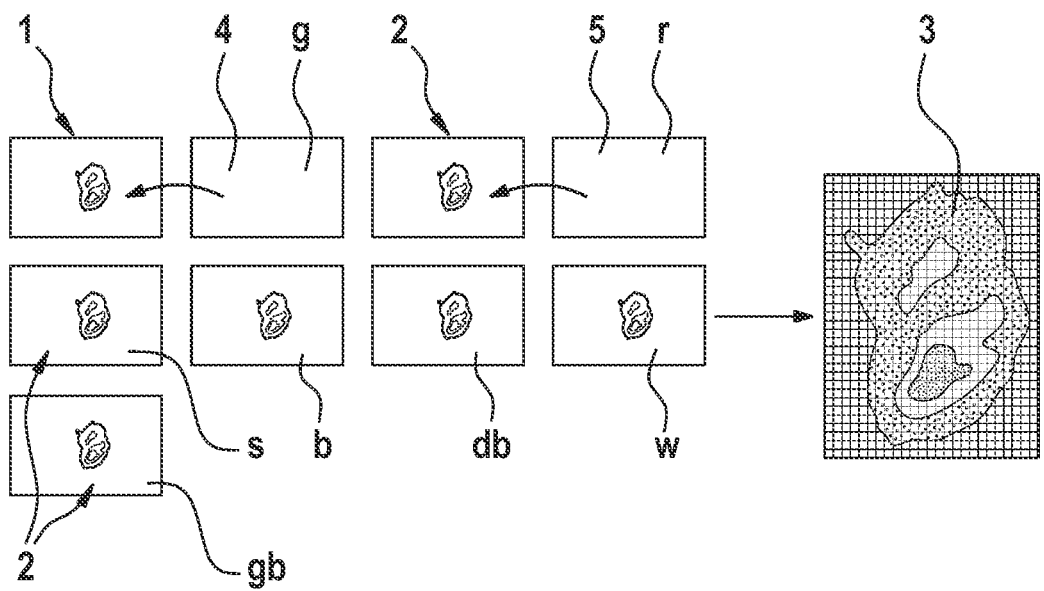
FIG. 11 shows an example of a possible application of the method of the present invention described here.

FIG. 11 schematically shows an example of the extraction, as may be carried out illustratively in a specific embodiment of the method: The color and transmissivity of (foreground) object 3 are estimated (on the right) with the aid of the photographs, which are taken in front of differently colored backgrounds 4, 5 (on the left). The examples of different colors of backgrounds 4, 5 are represented here by the following contractions: green (g), red (r), black (s), blue (b), dark blue (db), white (w), yellow (gb).

Figure 12:
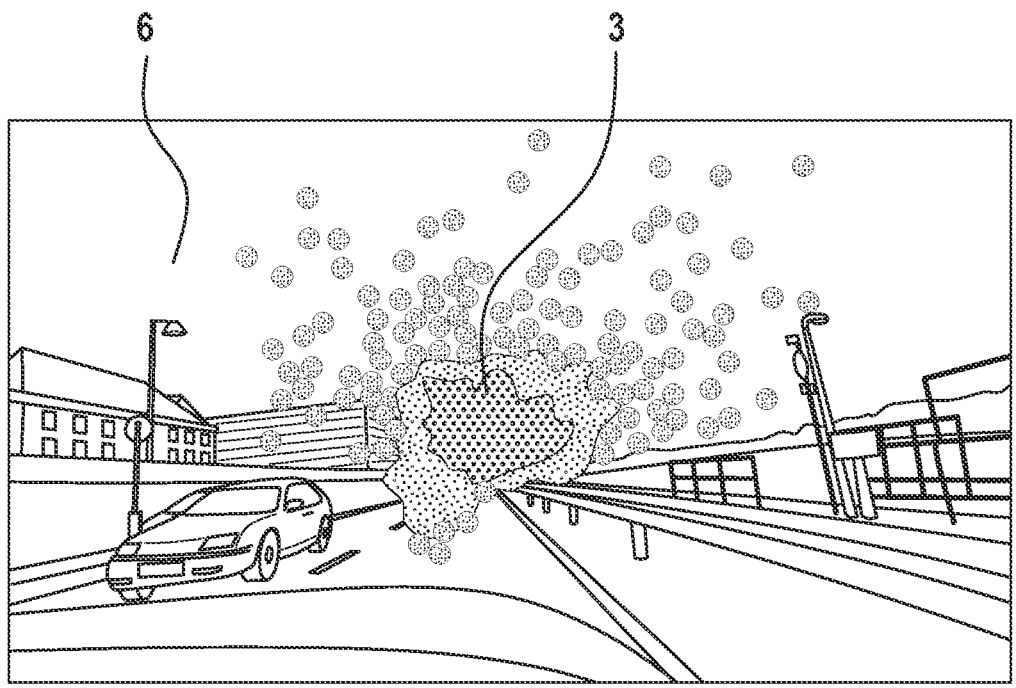
FIG. 12 shows an example of a further, possible application of the method of the present invention described here.

FIG. 12 shows an example of dirt as a possible foreground, which is placed in a mixed reality approach, with the aid of a virtual windshield model, over a conventional video sequence (without visual limitation), from field shots in road traffic. The depth of focus of the target camera may be simulated correctly in an advantageous manner, using a model including a thin lens (thin-lens model). This constitutes, first of all, an application-specific example that, and possibly of how, in a step d), the extracted object 3 may be combined with a third background 6 or a third scene. The correspondingly modeled and/or generated image representation may be used in a particularly advantageous manner as training data for an object recognition algorithm for a motor vehicle camera system.

In addition, This also constitutes an example that, and possibly of how, the method is used for simulating at least one object 3, which blocks at least a portion of the view.

In the following, further advantageous aspects, which may be used in the described method, are explained:

Regarding the shooting (step c): As represented by way of example in FIGS. 9 and 10, the shooting step may use three important components: a camera 8, an object 3 to be shot (also called the foreground or staging medium), and at least two backgrounds 4, 5. At least two shots 1, 2 for each object 3 may be taken in front of uniformly colored background walls. In the following, the role of the individual components is described in detail, and possible variants are put forward.

Camera 8 is used for shooting images 1, 2 of foreground object 3. It is possible to use the "target" camera type, which is also used for shooting the background scenes for the application (step d). However, the use of a different (as a rule, better) camera 8 with a customary RGB color filter array, a higher resolution, less noise, and/or a high luminous intensity objective may be advantageous, since the images acquired in this manner may be used again for different target cameras.

Camera 8 may be operated manually or controlled remotely and parameterized, using a computer 14. Computer 14 may store the recorded images for later and/or process them online. It may optionally give feedback (e.g., a live preview), which is useful for the shooting operation.

The foreground may be a flat object 3 or an arbitrary, largely static (e.g., dried) medium. It may be positioned freely at a suitable location in the optical path (the "stage") or applied to an exchangeable staging plate 11 (e.g., to a glass plate), which is secured in a holding device 12 (see example in FIGS. 9, 10). The stage may also include an application-specific, transparent object, such as a windshield.

The takes 1, 2 may be carried out, forming a sharp image of the foreground, which is advantageous, if the target set-up is not known at the time of the shot or the shot 1, 2 is intended for use in different target set-ups. Alternatively, the foreground may be shot out of focus in accordance with the depth of focus of the target set-up, which may be used as a reference for the application or may supply more realistic results, when only one particular target set-up is present.

In addition, object 3 may either be tilted in accordance with the target set-up or positioned parallelly to the focal plane. The latter may be advantageous in combination with a sharp image of the foreground and/or in the case of use in a plurality of target set-ups.

Images and/or shots, which may be used as reference images during the extraction step, may be taken without (foreground) object 3. These images may be taken with or without a staging plate or application-specific stage; in this case, the staging plate being intended to be clean, that is, to not carry an object 3.

The foreground may optionally be lighted by one or more illuminating devices 13.

Background 4, 5 may include a plurality of colored walls, screens or shades (e.g., made of uniformly colored material). A plurality of different chromatic or achromatic colors may be used (such as red, green, blue, yellow, black, white, orange).

The background color may be changed during the take, in order to acquire different combinations of foreground and background 4, 5. Additional reference images may be shot without (foreground) object 3 for no, some, or all background walls. Reference background images are advantageous during the extraction, but due to limitations in the shooting device, they may not always be taken for all backgrounds 4, 5. In order to be used as a reference during the extraction, it is advantageous to capture the reference images of background 4, 5, using the same camera settings (in particular, focus) as the images of the foreground. The background color advantageously does not change between the shooting of the foreground image and the shooting of the reference background image.

Background 4, 5 may (alternatively) be made up of a light-emitting device or a (video) screen, which is illuminated actively, using changing color (e.g., a computer monitor/video screen, a television set, or a projector, which illuminates a white projection surface). This device may optionally be connected to a computer 14 and controlled by it. Computer 14 may be the same computer 14, which is also used for operating camera 8, or a separate computer 14. In this manner, the image capture and the change of background color may be synchronized or coordinated, in order to improve the shooting rate and, by this, to allow the shooting 1, 2 of non-static foregrounds.

Background 4, 5 may optionally be lighted by one or more illuminating devices 13.

The shooting may be done in interior spaces (e.g., in a room, in a shoebox, or in a vehicle) or in the open. The location used for the recording may optionally be shielded from external light sources.

Regarding the extracting: In one advantageous specific embodiment, extraction may be carried out, using physically motivated models. (Foreground) Object 3 may be separated from backgrounds 4, 5, in order to prepare it for the application (step d). In particular, the color and the transmissivity of the foreground may be estimated for each pixel. An example is shown in FIG. 11.

The estimation of color and transmissivity may be based on physically motivated modeling of the effect, which a foreground in the optical path between an observer and a background 4, 5 has. In this context, identical, similar, or different models may be used, in order to model, in each instance, the shooting situation (including object 3 and background 4, 5) and application situation (including background 6). The most common model in chroma keying uses gradual pixel-by-pixel transition between foreground RGB $(r_F, g_F, b_F)$ and background RGB $(r_B, g_B, b_B)$ on the basis of a foreground opacity value $\alpha \in [0, 1]$:

Observation Foreground Background $$\begin{pmatrix} r \\ g \\ b \end{pmatrix} = \alpha \cdot \begin{pmatrix} r_F \\ g_F \\ b_F \end{pmatrix} + (1-\alpha) \cdot \begin{pmatrix} r_B \\ g_B \\ b_B \end{pmatrix} \quad (1)$$

In (1), there is only one value of the opacity (opacity value) for all channels. The transmissivity, which, as a rule, corresponds to the opacity (as $1-\alpha$), is therefore modeled as independent of wavelength. If a wavelength-dependent transmissivity is intended to be modeled, then, for example, a three-channel $\alpha$-expansion may be used; the color channels (RGB channels) each being superposed on the basis of the channel-by-channel opacity $(\alpha_r, \alpha_g, \alpha_b)$. These models are only examples for illustrating the method. They may be replaced by models, which more closely approach the physics, or which use the other or additional parameters, which are of interest.

A target function may be derived on the basis of the physical model, so that the extraction may be represented as an optimization problem. The target function may be derived according to the maximum likelihood method, which, as a rule, results in a least squares target function (least squares method) (in particular, if independent and normally distributed observations may be assumed), which may describe its pixel-by-pixel residuals as the difference between the model and observation.

The target function may assume information regarding backgrounds 4, 5 to be fully given, partially given, or completely unknown. Information not given (such as the variance of the illumination over the background) may be incorporated into the estimation operation as an unknown. Models for the background color and background illumination may be introduced for this purpose. These may be simple, constant models, but also complex, nonlinear models. The introduction of a variable luminous density into the models of the backgrounds without reference shots may have a highly positive effect on the overall extraction quality.

The target function may be expanded, in order to compensate for (=to model and to estimate) temporally varying foreground illumination, which results from changing conditions during the shooting operation. This may improve the overall quality of the estimation, in particular, in the case of use of computer monitors having markedly varying illumination, as a background.

The estimating operation may include a transmissivity correction for the effect of the staging plate on the shot, if, for example, the background reference images are captured without a preparation plate.

The estimating operation may compensate for possible displacement or unsteadiness of the shooting medium and/or object 3 during the different takes. This displacement may be caused, for example, by vibration of the set-up or ongoing deformation of the shooting medium. For this purpose, the different captured images may be correlated by a transformation in pixel coordinates. This transformation may be derived, e.g., from a dense optical flow or from simpler transformations, which are supplied by a plurality of scale-invariant feature transform (SIFT) features.

The model and the target function may differentiate between transparent forms (that is, retaining the background structure) and translucent forms (that is, imaging the background structure unsharply/diffusely) of transmission.

Depending on the configuration (see variants), it is advantageous to delimit the search space of the target function, in order to not run into instances of ambiguity.

Depending on the configuration (see variants), the target function is generally nonlinear. Using a premultiplied a and the assumption, that the background colors are given, the target function may be linearized, which constitutes a large advantage with regard to a rapid and reliable estimation.

The extraction workflow may combine a nonlinear preliminary estimate with a linear, highly resolved estimate. This may be advantageous, in particular, during the implementation.

The extraction may include heuristically motivated processing steps, e.g., in order to overcome known limitations of the physically motivated steps (e.g., residual noise in the α-channel), and/or in order to improve the (overall) realism of the result and/or to bring the estimation results into an advantageous range for later use. These steps may also include human/manual processing, such as manually controlled parameterization or manually executed selection of an image detail.

Regarding the application: In one advantageous specific embodiment, the method may be used, e.g., in mixed-reality video blockage. A foreground object 3 extracted once (see above) may be applied repeatedly to different background scenes 6 (see, e.g., FIG. 12). In order to blend extracted foreground object 3 with new background 6, the same blending model may be used as in the extraction (e.g., according to equation (1)).

In particular, if the shooting situation deviates from the target situation, e.g., since different cameras have been used for the shots, it is useful to adapt the extracted foregrounds/objects 3 to the target situation, e.g., by simulating the target camera and the target scene geometry.

EXAMPLES

Windshield: If the target camera is situated in back of a windshield (or comparable transparent elements in the field of view), foreground object 3 may be blurred or projected virtually, for example, appropriately shaped or inclined as the windshield at the specific position. For this purpose, it is advantageous to know the shot geometry. It is advantageous, for example, to flatten out, press flat, press, smooth out and/or level off staged object 3 and to orient object 3 possibly parallelly to the focal plane. This is also advantageous with regard to a fixed focus.

Defocussing: If the foreground and/or foreground object 3 positioned virtually in front of the target camera lies outside of the depth of focus area of the target camera, the defocussing may be simulated during the application. For example, a thin-lens model may be used for most current cameras 8.

Objective distortion: If the target camera has a significant level of objective distortion, foreground object 3 may be correspondingly blurred.

Color filter array (CFA): If the target camera has a color filter array different from that used during the shooting, e.g., RCCB instead of RGGB, the color channels may be adapted approximately to the target camera.

Noise: The noise of the target camera may be simulated on foreground object 3 or transmitted to the foreground object 3 already combined with the background scene. This step is advantageous, if the shooting camera 8 generates markedly less noise than the target camera. If the shooting noise is orders of magnitude less, then it may be considered to be zero, and only the target noise may be simulated. Otherwise, the delta noise may be modeled and simulated.

Exposure to light: If the light-exposure parameters of the target camera are known, then effects on foreground object 3 specific to light exposure may be simulated, e.g., unsharpness due to movement, or HDR artifacts.

In particular, in cases in which the scene content has no influence on foreground object 3, it is possible to simulate the target set-up as described above, before the transformed foreground is blended with background 6.

In particular, in the case of recognition applications, such as in connection with video blockage, advantageous designations (labels) may be derived for the foreground objects. These may correspond, e.g., to particular $\{\alpha > \varepsilon\}$ level sets. The labels may be represented, e.g., as pixel-by-pixel annotations or limiting polygons, which approximate the shape of the foreground and thus imitate the action of human labelers. A further option includes designations (labels) or tags, which are valid for the entire image. These may optionally contain additional metadata, which are collected during the shooting operation.

In particular, in the case of video blockage, it is advantageous to stage many types of rare and different effects, such as bird droppings, chipped rock, refuse, mud, plant parts, lubricant films, salt layers, dust layers, and/or different opaque objects.

As an option, object 3 (which may be extracted here in the manner of a template (stencil)) and/or background 4, 5 may be additionally processed during the application on the basis of physical and/or heuristically motivated considerations. For example, the background regions covered by object 3 and/or by the template may be rendered additionally unsharp, and/or the α-channel may be cut off or set to 1. This may be advantageous for increasing the effect variance further and/or achieving more realistic effects in connection with sight limitations/blockage effects (natural disturbances) and/or adapting the results to the intended application (e.g., cutting-off of α, in order to generate only slight interference for the application of rendering robust).

Optionally, the illumination of the target scene may be estimated and used for simulating its influence on the applied foreground. To this end, additional measures may be advantageously taken during the shooting and extraction, such as the shooting and modeling of different instances of foreground lighting.

Transmissivity-aware chroma keying, as in described in the present invention, requires, in particular, a suitable physical set-up of the shooting device, as well as a suitable shooting operation. The changing of the background color in the same image detail, that is, in a static scene, is a characteristic feature of the present invention.

Particular advantages of the method, in particular, with regard to the individual components of the method, are explained in the following.

Regarding the chroma keying: A particularly advantageous improvement of the transmissivity-specific chroma keying in comparison with classic chroma keying is the option to extract, that is, to model in a closed physical manner and to estimate, color and transmissivity of a staged object/medium/foreground in a unified estimate on the basis of a physical model. In this manner, disadvantageous bypassing solutions may be prevented, such as the limitation of the foreground object to colors, which differ markedly from the background, or error-prone heuristics regarding the expected transmission behavior, or required, extensive, manual post-processing.

At least two considerable improvements over the related art may be achieved by an expanded physical model, which takes into account the additional information from the shooting of a plurality of backgrounds:

Overcoming ambiguity: Color and transmissivity (opacity) of the object/medium/foreground may be estimated without ambiguity (see, e.g., FIG. 4, and FIGS. 6A and 6B).

Enabling wavelength-dependent transmissivity: In particular, over and above the overcoming of the ambiguity for an α-channel, it may allow wavelength-dependent modeling of the transmissivity, as shown, e.g., in FIGS. 7A-7C, for example, by expanding the elementary gradual transition model to three α-channels. This may render completely new effects possible. For example, the combination of high background contrast with intensive foreground coloring (as in the case of looking through colored glass), using only one wavelength-independent transmission channel, is normally not possible (see FIGS. 8A-8C).

However, the awareness of transmissivity may also produce particular disadvantages: The consideration of the transmissivity during chroma keying may result in more complex and/or less dynamic shots. In addition, not all classical chroma keying applications may benefit from consideration of the transmissivity in this form. Therefore, the applications for classic chroma keying may only overlap partially with those of the approach described here. However, transmissivity-aware chroma keying may also permit completely new applications or improve current ones tremendously. This may be the case, for example, during the generation of video blockage data in mixed reality applications.

Regarding the application: The table in FIG. 5 gives an example overview of how chroma keying may be evaluated in comparison with other methods for generating video blockage data and/or for acquiring real-world data. In particular, one or more of the following advantages may be attained in the application:

Effect variance: The data generation based on chroma keying may be well suited for determining different effects. In particular, when shooting under laboratory conditions, recordings for many (in some instances, even for all) types of video blockages may be made in an efficient manner. In particular, by using exchangeable glass plates for the staging, it is possible to prepare staged objects, which must normally dry (e.g., salt layers), in the run-up to shooting. Shot one time, each effect may be used in an unlimited manner on all types of cameras and scenarios. Chroma keying is by far the most efficient way to accumulate different video blockage effects:

In comparison with other data acquisition methods: All other data generation methods are, as a rule, designed in such a manner, that they each simulate exactly one effect. In synthetic physics, each simulated effect is normally the result of complex technical development. Perlin noise may also generate only one single limited effect, and for GAN's, one GAN must often be trained per effect, which requires enormous quantities of data.

Compared to the acquisition of real world data: The accumulation of different effects from acquisition in the field is, as a rule, expensive and may generate, for the most part, the same type of effects (weather, fogged windshield, icing, . . . ). It is, in particular, not useful to drive millions of kilometers and hope that a plastic bag suddenly covers the camera. In contrast to that, the staging of actual visual impairments in the field trial allow a large variance of effects to be controlled and forced. However, this may be less efficient, since one has to rely on the perfect preparation of all effects to be staged, as well as a vehicle having measuring technology for carrying out the field shots. In particular, this approach may have the considerable disadvantage of expensive labelling and/or low scene variance.

Scene variance: All of the approaches to data generation are designed, as a rule, to supplement regular sequences. Therefore, they may be well suited to maximize the background variance. This is a particular weakpoint of staging in the vehicle. Staging in the laboratory may have the advantage of being able to apply an effect that is shot once to many different backgrounds and background scenes.

Designation/labeling: Chroma keying may advantageously allow advantageous labels to be generated without relevant expenditure. This is particularly advantageous in comparison with actual data acquisition, in which the designation, that is, the labeling, is extremely expensive.

Rare scenarios: Chroma keying may advantageously allow the recording of rare scenarios, which would otherwise not be able to be recorded or recorded only with a large amount of outlay/at high cost. Thus, it may contribute to overcoming the problem of video blockage as an open world scenario.

Camera independence: Video blockage effects recorded once on the basis of chroma keying may be advantageously applied to different cameras. This reuse of data may allow a large quantity of realistic video blockage data to be generated from sequences free of visual impairment, of new camera generations and/or of new camera positions, without any relevant outlay. This may permit video blockage solutions for new cameras to be developed early on and/or make a high level of performance possible already in the first few days. In addition, video blockage classifiers specific to the location of a camera may be trained, which is, e.g., most useful for stationary surveillance cameras. All of this may be combined advantageously with transfer learning, in order to advantageously bridge a possible gap between generated and actual data.

There are also some areas, in which chroma keying performs less effectively than other methods, as is apparent from the table in FIG. 5, as well. Distortion effects may not be imaged effectively, since further model components would be necessary to image distortion effects. The temporal dynamics are restricted by the fact that the objects released and/or the backgrounds used are initially static. The in-effect variance describes different forms of a particular effect. One effect is, for example, impact from broken stone. The in-effect variance includes, for example, different instances of impact from broken stone and/or the shooting of them. During the use of chroma keying, many different shots of the same effect are necessary, in order to obtain an effective in-effect variance.

In addition, the generation of video blockage data on the basis of chroma keying may profit in large part from the advantages of transmissivity awareness. It is, in particular, able to acquire many or all combinations of color and transmissivity (opacity) in an advantageously precise manner and supports more effects and/or variance than the classical chroma keying. Apart from that, the method may benefit from a rapid and/or substantially automated extraction operation, in particular, without the use of classic chroma-keying bypass solutions.

What is claimed is:

1. A chroma keying method, the method comprising the following steps:
   a) obtaining a first shot of an object in front of a first background, the first background being characterized by a first color;
   b) obtaining a second shot of the object in front of a second background, the second background being characterized by a second color, the second color being different than the first color, so that the first and second backgrounds differ from each other with respect to color;
   c) a modeler using varying qualities of appearance of the object in the first and second shots to estimate, for each of a plurality of pixels the modeler assigns to the object, a respective color and respective wavelength-dependent transmissivities to each of a respective color and transmissivity.

2. The method as recited in claim 1, further comprising:
   d) combining the plurality of pixels assigned to the object with a third background or a third scene, which differs at least partially from the first background and/or the second background.

3. The method as recited in claim 1, wherein the method is used to generate mixed reality data for video blockages.

4. The method as recited in claim 1, wherein the first shot and the second shot relate to the same image frame.

5. The method as recited in claim 1, wherein the method is used for simulating at least one object, which blocks at least a portion of a view of a camera.

6. The method as recited in claim 1, wherein the first and second background are the same as each other, except for their respective colors.

7. A non-transitory machine-readable storage medium on which is stored a computer program that is executable by a computer and that, when executed by the computer, causes the computer to perform a chroma keying method, the method comprising the following steps:
   a) obtaining a first shot of an object in front of a first background, the first background being characterized by a first color;
   b) obtaining a second shot of the object in front of a second background, the second background being characterized by a second color, the second color being different than the first color;
   c) a modeler using varying qualities of appearance of the object in the first and second shots to estimate, for each of a plurality of pixels the modeler assigns to the object, a respective color and respective wavelength-dependent transmissivities to each of a respective color and transmissivity.

8. An object recognition system configured to perform the following for a chroma keying method:
   a) obtain a first shot of an object in front of a first background, the first background being characterized by a first color;
   b) obtain a second shot of the object in front of a second background, the second background being characterized by a second color, the second color being different than the first color;
   c) implement a modeler that uses varying qualities of appearance of the object in the first and second shots to estimate, for each of a plurality of pixels the modeler assigns to the object, a respective color and respective wavelength-dependent transmissivities to each of a respective color and transmissivity.

* * * * *